(12) United States Patent
Brushkivskyy

(10) Patent No.: US 11,767,910 B2
(45) Date of Patent: Sep. 26, 2023

(54) PLANETARY GEAR SYSTEM

(71) Applicant: ZF Friedrichshafen AG, Friedrichshafen (DE)

(72) Inventor: Vyacheslav Brushkivskyy, Kressbronn am Bodensee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 171 days.

(21) Appl. No.: 17/415,994

(22) PCT Filed: Dec. 13, 2019

(86) PCT No.: PCT/EP2019/085044
§ 371 (c)(1),
(2) Date: Jan. 19, 2022

(87) PCT Pub. No.: WO2020/126887
PCT Pub. Date: Jun. 25, 2020

(65) Prior Publication Data
US 2022/0163106 A1   May 26, 2022

(30) Foreign Application Priority Data
Dec. 20, 2018 (DE) ..................... 10 2018 222 527.3

(51) Int. Cl.
*F16H 57/08* (2006.01)
*F16H 57/04* (2010.01)

(52) U.S. Cl.
CPC ......... *F16H 57/082* (2013.01); *F16H 57/043* (2013.01); *F16H 57/0427* (2013.01); *F16H 57/0479* (2013.01); *F16H 57/0482* (2013.01)

(58) Field of Classification Search
CPC .. F16H 57/082; F16H 57/0427; F16H 57/043; F16H 57/0479; F16H 57/0482
See application file for complete search history.

(56) References Cited

U.S. PATENT DOCUMENTS 4,797,611 A * 1/1989 Schreiber ................. G01P 1/00
307/106
8,330,451 B2   12/2012 Schunk et al.
(Continued)

FOREIGN PATENT DOCUMENTS

CN         113389878 A  *  9/2021
DE  10 2008 042 961 A1    4/2010
(Continued)

OTHER PUBLICATIONS

German Search Report Corresponding to 10 2018 222 527.3 dated Aug. 21, 2019.
(Continued)

*Primary Examiner* — Derek D Knight
(74) *Attorney, Agent, or Firm* — Finch & Maloney PLLC

(57) ABSTRACT

A planetary gear system with a planetary carrier and a plurality of planetary gearwheels which are mounted on the planetary carrier by way of planetary gear bolts and planetary bearings. Each planetary gear bolt has at least one bore for supplying the planetary bearings with lubricating oil. The at least one bore is associated with an oil-catching element of a component fixed onto the planetary carrier, and the component is designed, in addition, to be a pulse generator for a rotational speed sensor. The pulse generator has a plurality of raised areas which are arranged around the circumference of the component and which extend in the axial direction.

12 Claims, 3 Drawing Sheets

(56) References Cited

U.S. PATENT DOCUMENTS 9,594,090 B2 * 3/2017 Heuver ................ G01P 1/026
2013/0012350 A1 1/2013 Ebner

FOREIGN PATENT DOCUMENTS

| DE | 10 2008 056 700 A1 | 6/2010 |
| DE | 10 2009 045 676 A1 | 4/2011 |
| DE | 10 2014 202 425 A1 | 8/2015 |
| DE | 10 2016 105 293 A1 | 10/2016 |
| DE | 10 2016 216 669 A1 | 3/2018 |
| DE | 10 2017 205 491 A1 | 10/2018 |
| DE | 102017205491 A1 * | 10/2018 |
| JP | H04-60254 A | 2/1992 |
| JP | 2-888938 B2 | 5/1999 |
| KR | 10 2009 043253 A | 5/2009 |

OTHER PUBLICATIONS

International Search Report Corresponding to PCT/EP2019/085044 dated Apr. 29, 2020.
Written Opinion Corresponding to PCT/EP2019/085044 dated Apr. 29, 2020.

* cited by examiner

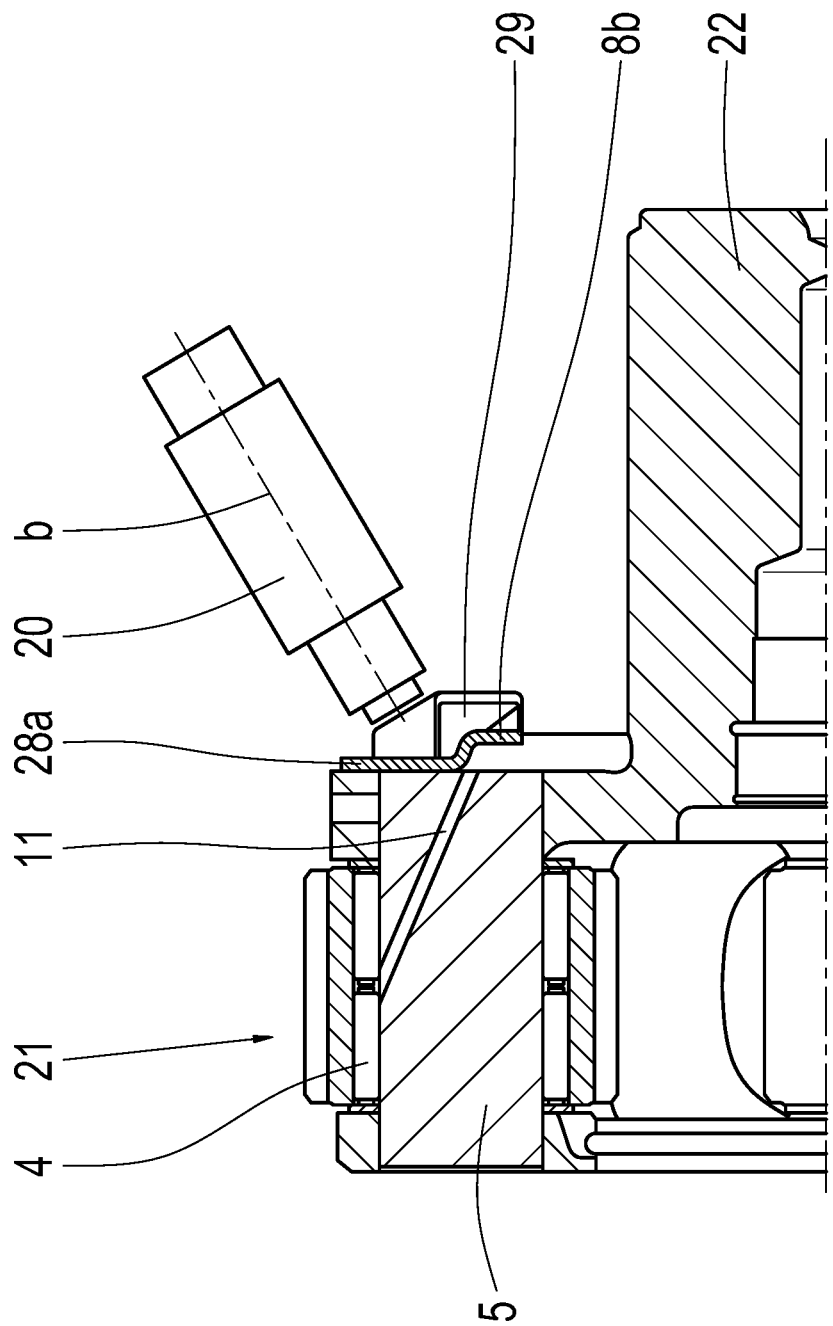

PLANETARY GEAR SYSTEM

This application is a National Stage completion of PCT/EP2019/085044 filed Dec. 13, 2019, which claims priority from German patent application serial no. 10 2018 222 527.3 filed Dec. 20, 2018.

FIELD OF THE INVENTION

The present invention relates to a planetary gear system according to the independent claim(s). In addition, the invention relates to a component for a planetary gear system comprising a planetary carrier and a plurality of planetary gearwheels.

BACKGROUND OF THE INVENTION

A planetary gear system of the aforesaid type is disclosed by DE 10 2017 205 491 A1. In that case a pulse generator, also called a signal generator, is in the form of a toothed disk with teeth arranged around its circumference, which when the planetary carrier rotates, delivers pulses in the form of signals to a rotational speed sensor, from which the rotational speed can be deduced. An oil-catching element is arranged in the area of a longitudinal bore in the planetary bolts, so that oil captured by the oil-catching element is conveyed in the axial direction into the longitudinal bore in the form of a blind bore, from where the oil makes its way through transverse or radial bores to the planetary bearings, where it ensures their lubrication.

Rotational speed sensors with pulse generators are, for example, known from DE 10 2009 045 676 A1 or from DE 10 2008 056 700 B4.

SUMMARY OF THE INVENTION

The purpose of the present invention is to achieve a further improvement of the object of the aforesaid application.

This objective is achieved by a planetary gear system and a component according to the independent claim(s). Advantageous design features emerge from the subordinate claims and from the description that follows, and the drawings.

According to the present invention a planetary gear system is proposed, which comprises a planetary carrier and a plurality of planetary gearwheels mounted relative to the planetary carrier by means of planetary bolts and planetary bearings. Each planetary bolt has at least one bore for supplying the planetary bearing with lubrication oil. The at least one bore is associated with an oil-catching element of a component fixed on the planetary carrier. It is provided that the component is in addition designed as a pulse generator for a rotational speed sensor, the pulse generator having arranged around the circumference of the component a plurality of axially extending raised areas. The raised areas, which extend in the axial direction, can be shaped in the form of pockets and will be referred to as pockets in the description given below. The metallic pockets, which are arranged on a face of the planetary carrier and form raised areas extending in the axial direction, produce pulses in a rotational speed sensor as they pass the rotational speed sensor fixed on the housing, which pulses for example deliver rectangular signals from which the rotational speed of the planetary carrier can be deduced. The rotational speed sensor is preferably in the form of a Hall sensor which is known and commercially available. For the fixed position of the rotational speed sensor on the housing, the sensor can be directly or indirectly connected to the housing of the planetary gear system.

In a preferred embodiment, the pockets are roof-shaped and have roof surfaces arranged obliquely or parallel to a radial plane or a notional flat surface. Thus, the roof surface forms a raised area in the axial direction which, as viewed in the circumferential direction, is followed by a recess. The pocket therefore forms one of a plurality of pulse generating elements arranged around the circumference.

In a further preferred embodiment, the pocket has a first opening which is open in the radial direction. The opening in the radial direction is there primarily for production technology reasons, particularly when the pockets are produced by deformation.

In a further preferred embodiment, the pocket has a second opening which is open in the axial direction, i.e. the pocket forms, as it were, a window in a radial plane. These openings too are produced for technical reasons.

According to another preferred embodiment, the component comprising the oil-catching element and the pulse generator is in the form of a sheet component, preferably made from a ferromagnetic material. This has the advantage of being cheap to produce. The sheet component, also called a combination component, which exercise the function on the one hand of an oil-catching element and on the other hand the function of a pulse generator, can be produced from a sheet-metal plate by deformation, in particular by cutting and stamping. The roof-shaped pockets are thus raised by cutting and stamping them out of the plane of the plate.

In a further preferred embodiment, the oil-catching element has a capturing shell in the form of an all-round raised area of the sheet component. In cross-section, the raised area is curved and in the radial direction it is open inward, so that the capturing shell can catch oil radially flung off and divert it into the longitudinal bores of the planetary bolts. This all-round capturing shell can be made simply by a stamping process.

According to a further preferred embodiment, the pulse generator and thus its pockets are associated with a rotational speed sensor fixed on the housing, the association being in relation to the roof surfaces of the pockets. The longitudinal axis of the rotational speed sensor, i.e. also the axis of its magnetic field, is orientated approximately perpendicularly to the roof surface of the pockets. With this arrangement a usable rotational speed signal is obtained.

The component according to the invention for a planetary gear system with at least one planetary carrier and a plurality of planetary wheels, comprising an oil-catching element and a pulse generator for a rotational speed sensor, is such that the pulse generator is formed by a plurality of roof-shaped raised areas extending in the axial direction and arranged around the circumference of the component. The raised areas extending in the axial direction can be shaped like pockets and will be called pockets in the description that follows.

In a preferred embodiment of the component the roof-shaped pockets have roof surfaces oblique or parallel relative to a radial plane or notional flat surface. Thus, the roof-like surface forms in the axial direction a raised area which, as viewed in the circumferential direction, is followed by a recess as far as the next pocket. So the pocket forms one of several pulse generating elements arranged around the circumference.

According to a further preferred embodiment, the component forming the oil-catching element and the pulse generator is in the form of a sheet component, preferably made of a ferromagnetic material. This has the advantage that it can be made inexpensively. The sheet component, also called a combination component which on the one hand functions as an oil-catching element and on the other hand functions as the pulse generator, can be produced from a sheet-metal plate by deformation, in particular cutting and stamping. The roof-shaped pockets are thus formed by cutting and pressing out of the plane of the plate. The pockets can have both a first opening which is open in the radial direction, and a second opening which is open in the axial direction. The openings in the radial and axial directions are there primarily for reasons of production technology, particularly when the pockets are produced by deformation. Pockets made in that way are also known as gills in stamping technology.

In a further embodiment, the pockets extending in the axial direction and constituting the pulse generators are formed in such manner that at the same time they form the oil-catching element. This gives the advantage of inexpensive production.

According to a further embodiment, as viewed in the radial direction, apart from the pockets forming the pulse generators the component also has further pockets arranged around the circumference of the component, which also extend in the axial direction. These pockets can be designed as described earlier, and thus form a second pulse generator. The component so formed can therefore serve as a pulse generator for two rotational speed sensors.

BRIEF DESCRIPTION OF THE DRAWINGS

An example embodiment of the invention is illustrated in the drawings and will be described in greater detail below, so that from the description and/or the drawings, further features and/or advantages can emerge. The drawings show:

FIG. 3: The arrangement of the rotational speed sensor relative to a pulse-generating ring.

DETAILED DESCRIPTION OF THE PREFERRED EMBODIMENTS

Figure 1:
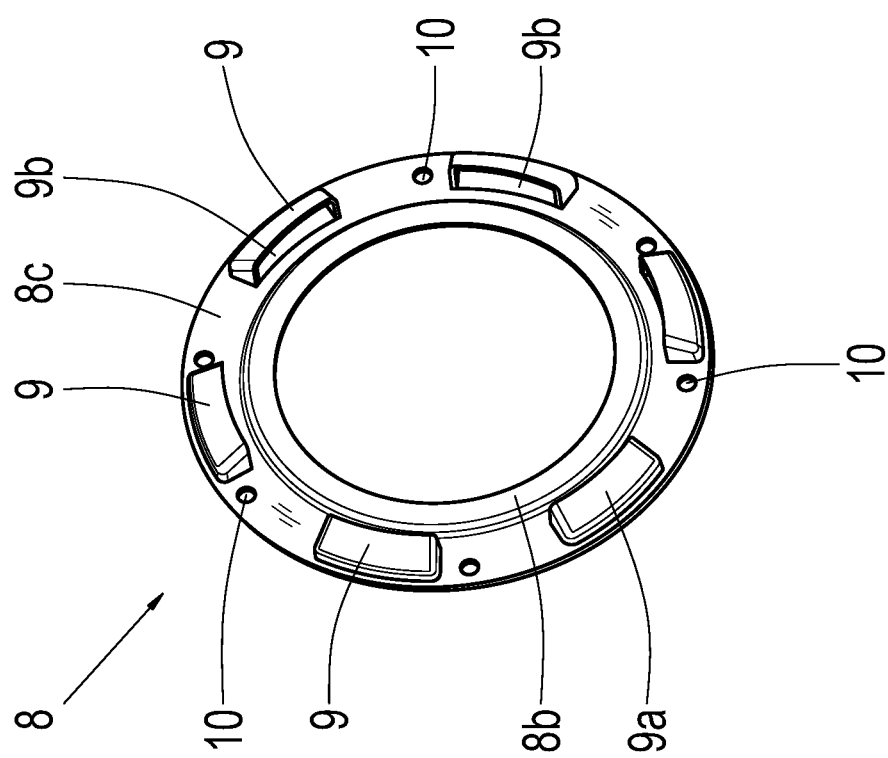
FIG. 1: A section of a planetary gear system with a combination component according to the invention, which component comprises a pulse generator and an oil-catching element.

FIG. 1 shows an axial section of part of a planetary gear system 1 having a central axis a, around which a planetary carrier 2 is rotatably arranged. The planetary gear system 1 has a plurality of planetary gearwheels arranged around its periphery, of which one planetary gearwheel 3 is shown in the drawing. This gearwheel 3 is mounted by means of a planetary bearing 4 in the form of a roller bearing 4, preferably a needle bearing 4, on a planetary bolt 5, which for its part is fixed firmly on the planetary carrier 2. The planetary bolt 5 has a through-going transverse or radial bore 6 located approximately in the middle, which is connected to a longitudinal or axial bore 7 that extends as far as the end of the planetary bolt 5. The planetary carrier 2 has a face 2a, shown on the right in the drawing, on which a combination component 8 according to the invention is fixed. The combination component 8, shown in isolation in FIG. 2, comprises on the one hand a pulse-generating ring 8a which serves as a pulse generator or signal generator for a rotational speed sensor (not shown here), and on the other hand an oil-catching shell 8b, which is arranged in the area of the longitudinal bore 7. In the diameter range of the longitudinal bore 7 the oil-catching shell forms an all-round annular chamber open inward, which is in flow connection with the longitudinal bore or bores 7 of each planetary bolt 5 in such manner that oil being flung off radially outward is diverted into the longitudinal bores 7 and from there, by way of the radial bores 8, makes its way to the planetary bearings 4 in order to ensure their lubrication.

Figure 2:
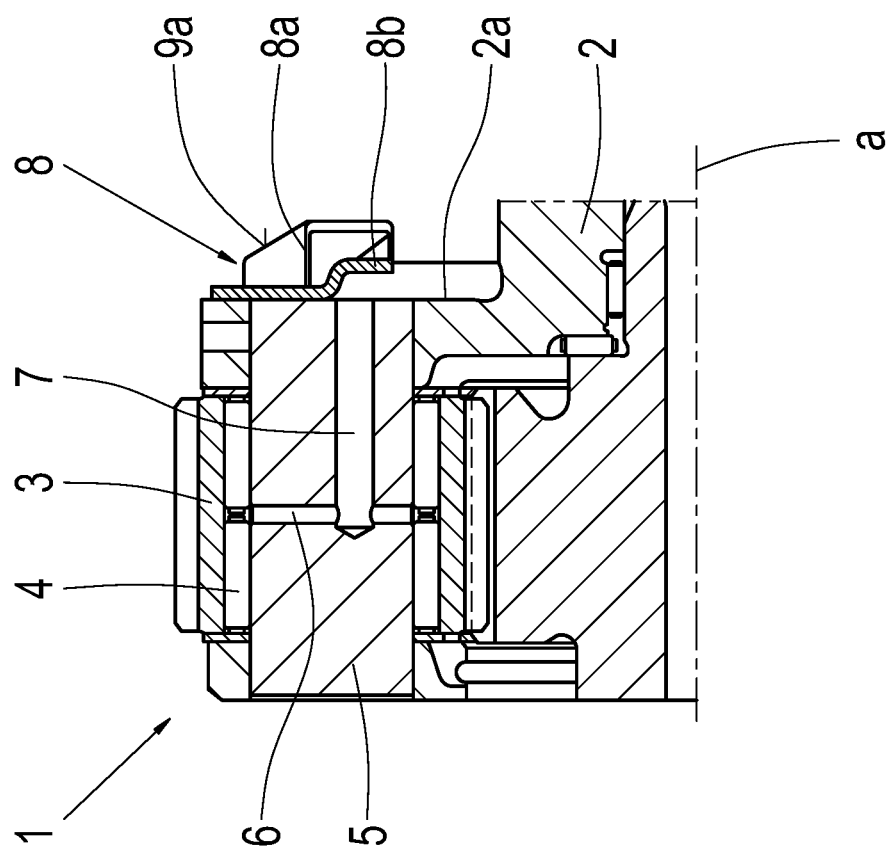
FIG. 2: The combination component in isolation, represented in 3-D.

FIG. 2 shows the combination component 8 according to the invention, illustrated in perspective in isolation, looking onto the outside 8c, i.e. the side facing away from the face 2a of the planetary carrier. The annular combination component 8 is in the form of a sheet component made from a sheet-metal plate by deformation. As can be seen from the drawing, the pulse-generating ring 8a comprises six pockets 9 arranged uniformly around the circumference, which pockets are produced from the sheet-metal plate by cutting and stamping. As can also be seen from FIG. 1, the pockets 9 each have roof surfaces 9a arranged obliquely relative to the face 2a or to a notional flat surface, which form an opening 9b that is open inward in the radial direction. On the reverse side of the annular combination component 8, in the area of the pockets 9 there is a recess or window in the material (not indexed), which is produced by the pressing-out of the roof-shaped pockets 9. The oil-catching shell 8b, whose cross-section can be seen in the axial section shown in FIG. 1, can be recognized in FIG. 2 as a circular raised area. Around its circumference the combination component has a plurality of fixing openings 10 which serve to enable the combination component 8 to be fixed onto the planetary carrier 2.

FIG. 3 shows, for a planetary gear system 21, a planetary carrier 22 with a pulse-generating ring 28a having pockets 29. A rotational speed sensor 20 with a longitudinal axis b is arranged fixed to the housing, leaving at its end an air gap between it and the pockets 29. In this case the longitudinal axis b is directed approximately perpendicularly to the roof surface 9a (FIG. 2) of the pockets 29. When the planetary carrier 22 rotates, the pockets of the pulse-generating ring 28a pass by the rotational speed sensor 20 at the speed of the circumference, each producing a pulse in the rotational speed sensor, which is preferably a Hall sensor. From this the rotational speed of the planetary carrier 22 is determined.

Otherwise than as shown in FIG. 1, in an alternative embodiment the planetary gear bolts 5 have a bore 11 extending obliquely for the supply of lubrication oil to the planetary bearings 4. The oblique bore 11 extends, starting from the end of the planetary gear bolts 5 through the bolt in a radially outward direction, and opens approximately at the center of the planetary bearing 4. Oil captured by the oil-catching shell 8b can thus make its way through the oblique bores 11 to the planetary bearings 4, to ensure their lubrication.

Figure 4:
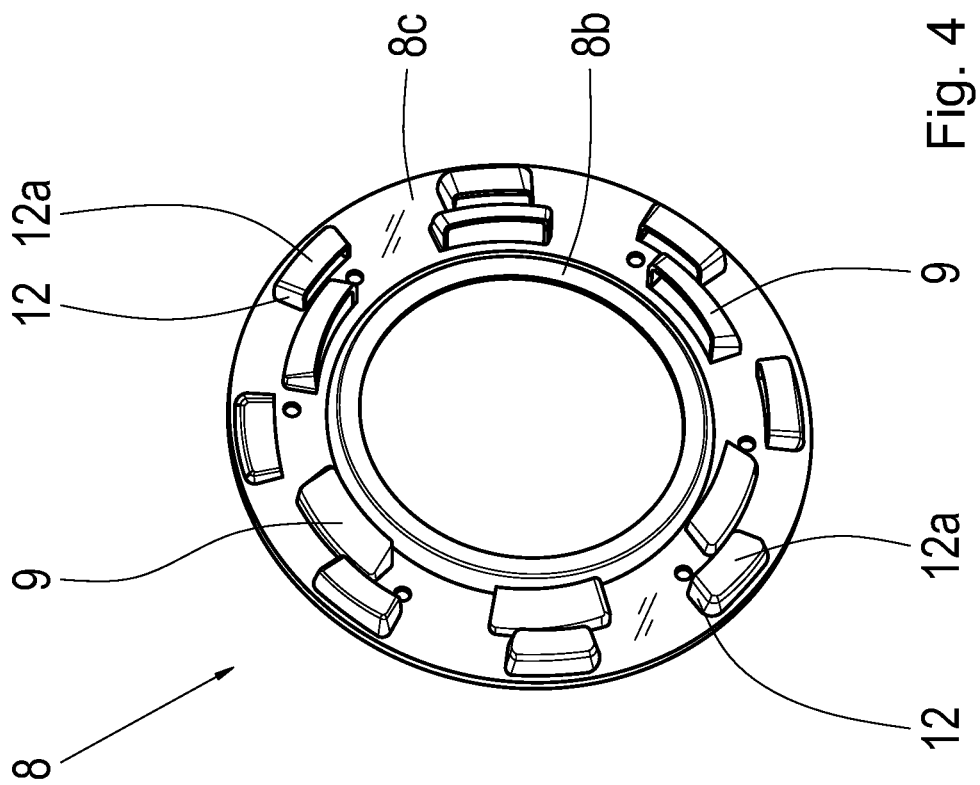
FIG. 4: The combination component in isolation, according to a second embodiment.

FIG. 4 shows a second embodiment of the combination component 8 according to the invention in isolation, represented in perspective, again looking onto the outside 8c. In this case too the combination component 8 shown in isolation is of annular form and has the pockets 9 described in FIG. 2 arranged uniformly around the circumference. In addition to these pockets 9, the combination component 8 shown in this case has further pockets 12 arranged around the circumference. Starting from the oil-catching shell, these further pockets 12, as viewed radially, are arranged outside the pockets 9. For example, the combination component 8 can have eight pockets arranged uniformly around the circumference. These pockets 12 too can be produced from the sheet-metal plate by cutting and stamping. As a difference from the pockets 9, in this case the pockets 12 have roof surfaces 12a which are parallel to the face 2a or to a notional flat surface, which again form an opening which is open in the radial direction toward the inside. On the reverse side of the annular combination component 8, in the area of the pockets 12 there are again material recesses or windows formed by the pressing-out of the roof-shaped pockets 12. The oil-catching shell 8b, whose cross-section can be seen in the axial section in FIG. 1, is in this case also in the form of a circular raised area. Around its circumference the combination component 8 has a plurality of fixing openings 10 which serve for fixing the combination component 8 to the planetary carrier 2.

If this combination component 8 is fixed onto a planetary carrier 2 as in FIG. 1 or a planetary carrier 22 as in FIG. 3, it can serve as the pulse-generating ring for two rotational speed sensors. A first rotational speed sensor, as illustrated in FIG. 3, is then arranged fixed on the housing with a longitudinal axis b leaving an air gap at the end between itself and the pockets 29. In this case the longitudinal axis b is positioned approximately perpendicularly to the surface that is oblique relative to the face 2a. In contrast, a second rotational speed sensor is positioned fixed on the housing with its longitudinal axis parallel to the central or rotational axis a of the planetary carrier 22, leaving an air gap at the end between itself and the pockets 12. In this case the longitudinal axis of the second rotational speed sensor is approximately perpendicular to the roof surfaces 12a of the pockets 12, which are parallel to the face 2a.

In an alternative arrangement the second rotational speed sensor can be positioned with its longitudinal axis also perpendicular to the central or rotational axis a of the planetary carrier 22 and radially so as to leave an air gap at the end between itself and the raised area of the pockets 12 that extend in the axial direction.

When the planetary carrier 22 rotates, the pockets 9, 12, 29 of the pulse-generating ring 8a, 29a move at the circumferential speed past the two rotational speed sensors and each pocket produces a pulse in the rotational speed sensor. From this, the rotational speed of the planetary carrier 22 is determined. The rotational speed sensors can be in the form of Hall sensors.

Figure 5:
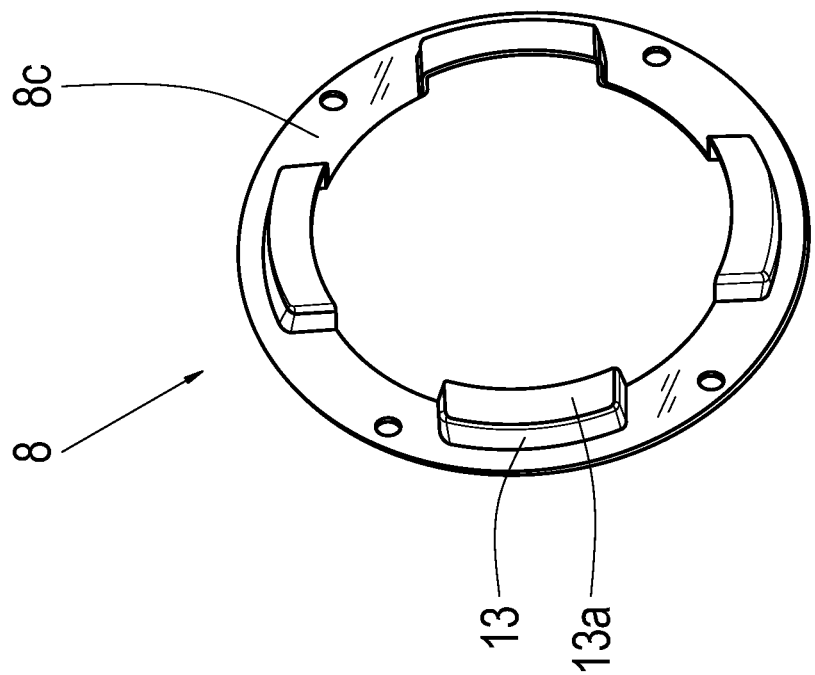
FIG. 5: The combination component in isolation, according to a third embodiment.

FIG. 5 shows a third embodiment of the combination component 8 according to the invention, in isolation and viewed in perspective, again looking at the outside 8c. The combination component 8 shown in isolation is in this case annular and has four pockets 13 distributed uniformly around its circumference. Here, the pockets 13 are made in such manner that they serve, as previously described, as pulse generators for a rotational speed sensor. For that purpose the pockets 13 can have roof surfaces 13a which are oblique or parallel relative to the face 2a or to a notional flat surface, which pockets form an opening which opens inward in the radial direction. As shown in FIG. 5, the opening can extend as far as the inner circumference of the combination component 8. In this case the pockets 13 are formed and distributed around the circumference of the combination component 8 in such manner that besides their function as pulse generators they also serve as oil-catching elements.

The pockets 13 can be produced from the sheet-metal plate by deformation, i.e. by cutting and stamping. On the reverse side of the annular combination component 8 there are again material recesses or windows in the area of the pockets 13 due to the pressing-out of the roof-shaped pockets 13. Arranged around its circumference the combination component 8 has a plurality of fixing openings 10, which are used for fixing the combination component 8 onto the planetary carrier 2.

The combination component 8 is fixed onto a planetary carrier 2 as in FIG. 1 or onto a planetary carrier 22 as in FIG. 3 in such manner that the pockets 13 formed as oil-catching elements are arranged in the area of the bores 7, 11 provided in the planetary gear bolts 5 for the supply of lubricating oil to the planetary bearings 4. The number of pockets 13 provided in the combination component 8 is thus at least the same as the number of planetary gears 3 of the planetary gear system 1 to be supplied with lubricating oil.

The pockets 13 made as oil-catching elements are in flow connection with the bores 7, 11 provided in the planetary gear bolts 5 in such manner that oil flung radially outward is captured and makes its way by way of the bores 6, 7, 11 to the planetary bearings 4, in order to ensure their lubrication.

INDEXES

1 Planetary gear system
2 Planetary carrier
2a Face
3 Planetary gearwheel
4 Planetary bearing/roller bearing
5 Planetary gear bolt
6 Radial bore/transverse bore
7 Axial bore/longitudinal bore
8 Combination component/common sheet component
8a Pulse generator/pulse generating ring
8b Oil-catching element/oil-catching shell
8c Outside
9 Pocket
9a Roof surface
9b First opening
10 Fixing opening
11 Bore
12 Pocket
12a Roof surface
13 Pocket
13a Roof surface
20 Rotational speed sensor
21 Planetary gear system
22 Planetary carrier
28a Pulse-generating ring
29 Pocket
a Central or rotational axis of the planetary carrier
b Longitudinal axis of the rotational speed sensor

The invention claimed is:

1. A planetary gear system with a planetary carrier and a plurality of planetary gearwheels, which are mounted on the planetary carrier by way of planetary gear bolts and planetary bearings,
   each of the planetary gear bolts having at least one bore for a supply of lubricating oil to the planetary bearings,
   the at least one bore being associated with an oil-catching element of a component fixed on the planetary carrier,
   the component, in addition, being designed as a pulse generator for a rotational speed sensor,
   the pulse generator comprising a plurality of raised areas which are arranged around a circumference of the component and which extend in an axial direction, the raised areas, extending in the axial direction, are of a roof-shaped form and are arranged, in each case, obliquely or parallel relative to roof surfaces in a radial plane, and the raised areas, extending in the axial direction, form first openings, which are open inward in a radial direction.

2. The planetary gear system according to claim 1, wherein the raised areas, extending in the axial direction, form second openings which are open in the axial direction.

3. The planetary gear system according to claim 1, wherein the component is made from sheet-metal.

4. The planetary gear system according to claim 3, wherein the raised areas, extending in the axial direction, are produced by deformation of the sheet-metal.

5. The planetary gear system according to claim 3, wherein the oil-catching element comprises a capturing shell which is in a form of an all-round raised area.

6. The planetary gear system according to claim 1, wherein the rotational speed sensor is associated with the pulse generator.

7. The planetary gear system according to claim 6, wherein the rotational speed sensor has a longitudinal axis and the longitudinal axis is orientated approximately perpendicularly to roof surfaces of the of the raised areas, extending in the axial direction.

8. A component for a planetary gear system with at least one planetary carrier and a plurality of planetary gearwheels, the component comprising:
an oil-catching element,
a pulse generator for a rotational speed sensor,
the pulse generator being in a form of a plurality of roof-shaped raised areas arranged around a circumference of the component for the planetary gear system,
the raised areas extend in an axial direction, and
the raised areas, extending in the axial direction and constituting the pulse generator, form the oil-catching element.

9. The component according to claim 8, wherein the raised areas, extending in the axial direction, have, in each case, roof surfaces, which are arranged oblique or parallel relative to a radial plane.

10. The component according to claim 8, wherein the component is formed from sheet-metal.

11. The component according to claim 10, wherein the raised areas, extending in the axial direction, and the oil-catching element are produced by deformation of the sheet-metal.

12. A component for a planetary gear system with at least one planetary carrier and a plurality of planetary gearwheels, the component comprising:
an oil-catching element,
a pulse generator for a rotational speed sensor,
the pulse generator being in a form of a plurality of roof-shaped raised areas arranged around a circumference of the component for the planetary gear system,
the raised areas extend in an axial direction, and
wherein when viewed in a radial direction, the component has, in addition to the raised areas forming the pulse generator, further raised areas around the circumference of the component, which extend in the axial direction and form a second pulse generator.

* * * * *